United States Patent [19]

Naf

[11] Patent Number: 5,007,461
[45] Date of Patent: Apr. 16, 1991

[54] METHOD FOR THE CLEANING OF THE INTERIOR OF INSTALLED CONDUITS

[75] Inventor: Werner Naf, Richterswil, Switzerland

[73] Assignee: interTechno AG, Richterswil, Switzerland

[21] Appl. No.: 203,695

[22] Filed: Jun. 7, 1988

[30] Foreign Application Priority Data

Jul. 9, 1987 [CH] Switzerland .................. 2604/87
Feb. 2, 1988 [CH] Switzerland ................... 346/88

[51] Int. Cl.$^5$ ............................................. F16L 55/18
[52] U.S. Cl. ................................. 138/97; 138/98; 134/22.12
[58] Field of Search ............... 138/97, 98; 29/81 K; 134/22.12; 51/317; 405/154

[56] References Cited

U.S. PATENT DOCUMENTS

| | | | |
|---|---|---|---|
| 2,331,824 | 10/1943 | Buckingham | 138/97 |
| 3,073,687 | 1/1963 | McCune . | |
| 3,139,704 | 7/1964 | McCune . | |
| 3,307,996 | 3/1967 | Keneipp | 138/98 |
| 3,946,125 | 3/1976 | Schriber | 138/97 |
| 4,022,935 | 5/1977 | Kinney et al. | 138/8 |
| 4,233,101 | 11/1980 | Scragg et al. | 138/97 |
| 4,327,132 | 4/1982 | Shinno . | |
| 4,505,613 | 3/1985 | Kogs | 138/97 |

FOREIGN PATENT DOCUMENTS

| | | |
|---|---|---|
| 1471510 | 12/1968 | Fed. Rep. of Germany . |
| 3235506 | 3/1984 | Fed. Rep. of Germany . |
| 3429881 | 2/1986 | Fed. Rep. of Germany . |
| 8306389 | 4/1983 | France . |
| 62-23484 | 1/1987 | Japan . |
| 2140337 | 5/1983 | United Kingdom . |

OTHER PUBLICATIONS

Basis-Römpp, Taschen-Lexikon der Chemie, Ihrer Randgebiete und Hilfswissenschaften, Band 2 M–Z, by O. A. Neumüller, Franckh'sche Verlagshandlung, Stuttgart (1977), p. 449.
Handbook of Chemistry, 10th Edition, N. A. Lange (Ed.), McGraw-Hill Book Company, Inc., N.Y. (1961), pp. 1852–1853.

Primary Examiner—James E. Bryant, III
Attorney, Agent, or Firm—Ladas & Parry

[57] ABSTRACT

A method for the repair of the inside of installed conduits comprises the following method steps:
  drying of the inside of the line by flow-through of pre-dried compressed air,
  removal of interior coatings by flow-through of a mixture of compressed air and particles of an abrasive medium with a mean exterior diameter of $>0.8$ mm and a specific weight of $>3.0$ g·cm$^{-3}$ in an amount of $>1.0$ g·m$^{-3}$, the mixture flowing through the line with a mean speed of $>10$ m·s$^{-1}$, relative to normal pressure, and
  blowing out the line by means of pre-dried compressed air.

The adhesive resin utilized for the subsequent coating contains, among others, a solvent-free 2-component resin and at least 5% by weight of finely dispersed inorganic oxidic adhesives.

6 Claims, No Drawings

METHOD FOR THE CLEANING OF THE INTERIOR OF INSTALLED CONDUITS

The invention described herein relates to method for the repair of the inside of installed conduits. Such conduits are, for example, supply and drain pipes for water or gas in residential, industrial and public installations up to an $O_i$ of approximately 200 mm; included in this are residential and industrial waste water lines.

The problem of incrustation of these conduits has been long known. Such incrustations are mainly based on calcium deposits from water, formation of rust in the conduit, other precipitates from the water, reaction products between substances contained in the water and the metal of the conduit, etc. Combinations of the known effects are also known.

Such incrustations are particularly annoying in connection with conduits which are inside walls or laid in the ground; this type of laying of conduits is the one more customary today. In connection with conduits which are laid in the open it is possible, if required, after removal of a part of the conduit, to clean the sections ahead and behind the opening mechanically by means of brushes which are pulled through or similar devices.

British GB A 2 140 337 teaches and claims a method according to the same species. Characteristic herein is that the cleaning flow as well as the resin mix flow pulsingly flow through the conduit to be repaired. Furthermore, size and amount of the abrasive particles added to the cleaning flow are not defined and the addition of adhesive materials to the repair resin also with particle sizes defined is not mentioned.

In accordance with the present invention it is just this combination of special additives which results in a satisfactory cleaning and even, well-adhering coating with resin of the inner wall of conduits, even without pulsing of the carrier flow.

In contrast to the method discussed just now, the method for cleaning and re-coating of the inner walls of utility water according to the invention basically differs in that it is optimized as a total method and thus leads to assured results.

Already, installed utility conduits are cleaned today by means of compressed air with or without the addition of sand, and such pre-cleaned conduits are already being dusted with reactive resins by means of compressed air. However, the inventors of the method described here have had the experience that most of the cleaning of this type primarily is based on individual knowledge of a routine type. Only the combination of the process steps in accordance with the method of the invention defined in the claims with the use of the adhesive resin also characterized in the claims results in a method for cleaning and interior coating of utility conduits which has a sufficiently assured effect. The final goal of this development is intended to be the set-up of computer-controlled installations.

In connection with a relatively known cleaning method on a primarily routine basis, compressed air is applied to the conduit to be cleaned by compressor installations which are mobile, if required. During a first phase, pre-drying is performed only by means of air warmed by compression. Subsequently, in a second phase, sand is added to the air flow. It is important that the air-sand mixture is conducted through the conduit with a spiral movement; movement of the mixture in a normal way is particular considered to be ineffective.

During a third phase of the known method a reactive resin is sprayed into the conduit and distributed therein, again by means of a spirally moving compressed air flow.

Furthermore, the method of the invention also differs in regard to the techniques of the method steps:

heating of the conduit system for drying is not required because the water absorption power of the pre-dried air greatly increases during expansion.

a spiral movement of the air-sand mixture appears not necessary when working under overpressure; additionally, only during this step of the method of the invention heating of the conduit system is achieved which is, compared with the methods of the state of the art, advantageous in respect to energy.

coating of the inside takes place by adding the processed resin to the conduit in the form of plugs; atomization of the resin before setting is to be avoided as much as possible.

A considerable chemical difference of the adhesive resin for the inner coating in accordance with the invention in respect to the known coating media is to be noted: the resin used according to the invention contains at least 5% by weight of oxidic adhesives, preferably $SiO_2$ aerosols and shows a viscosity of $>2\cdot10^4$ m Pa·s (25° C.) prior to being fed into the conduit which was heated in the meantime. According to observations made by the inventors, conduits can be coated with this adhesive resin in the direction of flow of the water as well as against it with satisfactory results.

The method of the invention for the accelerated cleaning and re-coating of the inner wall of a water line is characterized by the following method steps:

Drying of the inside of the line by flow-through of pre-dried compressed air,

Removal of interior coatings by flow-through of a mixture of compressed air and particles of an abrasive medium with a mean exterior diameter of $>0.8$ mm and a specific weight of $>3.0$ g·cm$^{-3}$ in an amount of $>1.0$ g·m$^{-3}$, the mixture flowing through the line with a mean speed of $>10$ m·s$^{-1}$, relative to normal pressure, and Blowing out the line by means of pre-dried compressed air.

In the said method, dry silicate sand having grain size limits between 0.8 to 8 mm, preferably of 2 to 4 mm, is advantageously used as abrasive medium in a proportion from 1 to 100 g/m$^3$ of air. In the same method the theoretical velocity of the air-sand mixture in the conduit is approximately 50 m/s, relative to normal pressure.

During cleaning the overpressure in the system is at least $>1$ bar, preferably $>2$ bar, relative to normal pressure.

It is furthermore advantageous that the addition of the adhesive resin, after it has been prepared, takes place in the form of plugs.

The adhesive resin to be used in accordance with the invention contains a solvent-free 2-component resin and at least 5% by weight of finely dispersed inorganic oxidic adhesives having a mean outer diameter of $<0.08$ mm, the viscosity of the adhesive resin at 25° being at least $2\cdot10^4$ m Pa·s.

The said 2-component resin is preferably an epoxy resin with a hardener and contains as oxidic adhesives particles primarily of $SiO_2$ with a lower grain size limit of approximately 10 μm.

As an example of the method according to the invention, use of the same for cleaning the supply water line for a private swimming pool is being reported.

After closing off all branch lines the inlet and outlet of this conduit were opened a day earlier.

On the day of operation itself the conduit was first pre-dried with compressed air from a construction compressor. The compressed air was pre-dried in a moisture separator before entering the conduit.

The required amount of air was calculated (as was subsequently done in connection with the cleaning an coating) from the table below:

| NW 15 mm - ½" | Conduit length up to 100 m | 7.5 m³/min. |
|---|---|---|
| NW 20 mm - ¾" | Conduit length up to 100 m | 7.5 m³/min. |
| NW 25 mm - 1" | Conduit length up to 100 m | 7.5 m³/min. |
| NW 32 mm - 5/4" | Conduit length up to 100 m | 10.0 m³/min. |
| NW 40 mm - 1½" | Conduit length up to 100 m | 14.0 m³/min. |
| NW 50 mm - 2" | Conduit length up to 100 m | 17.0 m³/min. |
| NW 65 mm - 2¼" | Conduit length up to 100 m | 24.0 m³/min. |
| NW 80 mm - 3" | Conduit length up to 100 m | 26.0 m/min. |
| NW 100 mm - 4" | Conduit length up to 100 m | 30.0 m³/min. |
| NW 125 mm - 5" | Conduit length up to 100 m | 35.0 m³/min. |
| NW 150 mm - 6" | Conduit length up to 100 m | 45.0 m³/min. |

However, the amounts of air indicated can vary greatly depending on the amount of branch lines and the degree of incrustation of the conduit.

In the present case the total length of the conduit was approximately 70 m; it mainly consisted of 1" and 1 ¼" pipes. The conduit was partially embedded and partially laid underground outdoors.

Pre-drying took approximately 30 minutes. A special separator was installed at the conduit outlet; the fine solid material exiting (apparently mainly calcium deposits and rust) entered a special separator.

Then a feeding device for the abrasive medium (dry regular sand with a grain size of 2 to 4 mm) was installed in the conduit between the compressor and the air inlet. A separator with a cyclone separator with pressure gauge and regulating valve was installed at the air outlet. Then work was done for approximately 8 minutes at a mean overpressure of approximately 1 atmosphere at highest compressor output and greatest abrasive medium feed. At the end of blowing approximately 200 kg of abrasive medium had been blown through the conduit to be cleaned. At the end of blowing the air exiting at the separator had a temperature of −50° C.

After a short period of blowing out, batches consisting of 4 kg adhesive resin each of the following composition were prepared; the resin was prepared so that it showed a viscosity of more than $2 \cdot 10^4$ Pa·s at approximately 25° C. The batches then were poured in the form of plugs into the air inlet (vertical) at the beginning of the conduit. The compressed air was immediately connected and the plug was then blown until clear resistance was no longer noted. Then another resin plug was inserted, etc. for a total of four times. Only at that time was discharge of resin from the end of the conduit noted.

| Basic Composition of the LSE Coating | |
|---|---|
| Epoxy resin: Bis-A or bis-A/F type | 47% by weight |
| Hardener: Aliphatic polyamine adduct | 19% by weight |
| Titanium dioxide | 4% by weight |
| Ferric oxide red | 10% by weight |
| Silicate filler | 15% by weight |
| Thixotropy (silicate) | 5% by weight |
| TOTAL | 100% by weight |

Finally, blowing was done for 30 minutes and the conduit was closed on top and bottom at the end of the blowing time.

Two days later the conduit was reconnected to the net and was thoroughly flushed initially.

Filling the pool after cleaning the conduit took approximately eight hours and resulted in clear water; prior to cleaning filling took more than 14 hours and the water was colored rust-red at times.

I claim:

1. A method of repairing, cleaning and coating the inside of an installed conduit, comprising the steps of:
   drying the inside of a conduit to be coated by flow-through of pre-dried compressed air,
   flowing-through the inside of said conduit a mixture of compressed air and particles of an abrasive medium with a mean exterior diameter of $>0.8$ mm and a specific weight of $>3.0$ g cm$^{-3}$ in an amount of $>1.0$ g m$^{-3}$, said mixture flowing through said conduit with a mean speed of $>10$ m s$^{-1}$ to remove materials adhering to the inside wall of said conduit,
   cleaning said conduit by flowing-through pre-dried and preheated compressed air until the outside temperature of the line is $>40°$ C. to remove any remaining materials which have been removed from the inside wall of said conduit, and
   subsequently coating the inside of the conduit by means of blowing in and blowing around an adhesive resin by means of compressed air, said adhesive resin being a solvent-free, self-setting resin with at least 5% by weight of inorganic oxidic adhesives with a mean diameter of $<0.08$ mm.

2. A method in accordance with claim 1, wherein said abrasive medium particles have a mean diameter of 0.8 to 8.0 mm, preferably one of 2 to 4 mm.

3. A method in accordance with claim 1, wherein said mean speed is $>50$ m/s.

4. A method in accordance with claim 1, wherein said pressure in said conduit is $>1$ bar.

5. A method in accordance with claim 1, wherein addition of said adhesive resin after its preparation takes place in the form of plugs.

6. A method in accordance with claim 1, wherein a pressure difference required for the flow through the conduit is created at least partially by means of a vacuum.

* * * * *